United States Patent [19]

Endo

[11] Patent Number: 5,027,197

[45] Date of Patent: Jun. 25, 1991

[54] IMAGE EXPOSURE DEVICE HAVING FRAME ADDITION UNIT

[75] Inventor: Yoshinori Endo, Nagoya, Japan

[73] Assignee: Brother Kogyo Kabushiki Kaisha, Nagoya, Japan

[21] Appl. No.: 406,531

[22] Filed: Sep. 13, 1989

[30] Foreign Application Priority Data

Sep. 19, 1988 [JP] Japan ............................. 63-234448

[51] Int. Cl.$^5$ ...................... H04N 1/46; G03F 3/10
[52] U.S. Cl. ........................................ 358/76; 358/80
[58] Field of Search ............... 358/75, 76, 29 C, 41, 358/44, 55, 58, 22, 80; 355/38

[56] References Cited

U.S. PATENT DOCUMENTS

| | | | |
|---|---|---|---|
| 4,496,983 | 1/1985 | Takenaka | 358/76 |
| 4,692,797 | 9/1987 | Matsumoto | 358/76 |
| 4,772,941 | 9/1988 | Noble | 358/76 |
| 4,860,058 | 8/1989 | Kobayashi et al. | |
| 4,896,183 | 1/1990 | Ohashi et al. | |
| 4,899,227 | 2/1990 | Yamada | 358/453 |

Primary Examiner—James J. Groody
Assistant Examiner—Kim Yen Vu
Attorney, Agent, or Firm—Oliff & Berridge

[57] ABSTRACT

An image exposure device for optically forming an image on a photosensitive medium in which an image emphasis effect is accurately obtained to easily classify and arrange pictures. The image exposure device comprises a display having a luminous screen for displaying an image data corresponding to an input picture signal and a frame portion surrounding the image and projecting the image of the image data and the frame portion on a photosensitive medium, a color indicating unit for indicating the color of the frame portion and outputting a color signal indicating the color and display control unit for controlling the display to display the frame portion on the screen in the color indicated by the color indicating unit in response to the color signal.

6 Claims, 3 Drawing Sheets

IMAGE EXPOSURE DEVICE HAVING FRAME ADDITION UNIT

BACKGROUND OF THE INVENTION

This invention relates to an image exposure device for optically forming an image on a photosensitive medium.

In a conventional image exposure device, an image is visualized on the luminous screen of a cathode ray tube (CRT) in accordance with a picture signal, and the image thus visualized is formed through an optical system on a photosensitive medium. In this process, the image is not visualized on the whole area of the luminous screen, but only within a prescribed are a (an image area) on the screen, so that no image is visualized outside of the image area and the outside of the image area remains colorless. Accordingly, when the contrast between the image of the image area and the background of the outside thereof is low, an image emphasis effect which would be obtained by the boundary between the image are and the outside thereof is reduced in the conventional device. Further, in a case where pictures obtained in the above device are required to be filed, classification and arrangement of the pictures are not easy.

SUMMARY OF THE INVENTION

An object of this invention is to provide an image exposure device in which an image emphasis effect is accurately obtained to easily classify and arrange pictures.

The above object is attained by provision of the image exposure device of this invention which comprises display means having a luminous screen for luminously displaying an image data and a frame portion on the screen and projecting the image and the frame portion on the photosensitive medium, the frame portion defining an area on which the image is formed, color indicating means for indicating the color of the frame portion and outputting a color signal indicating the color and display control means for controlling the display means to display the frame portion on the screen in the color indicated by the color indicating means in response to the color signal.

DETAILED DESCRIPTION OF THE INVENTION

The preferred embodiment of this invention will be described with reference to the accompanying drawings.

Figure 1:
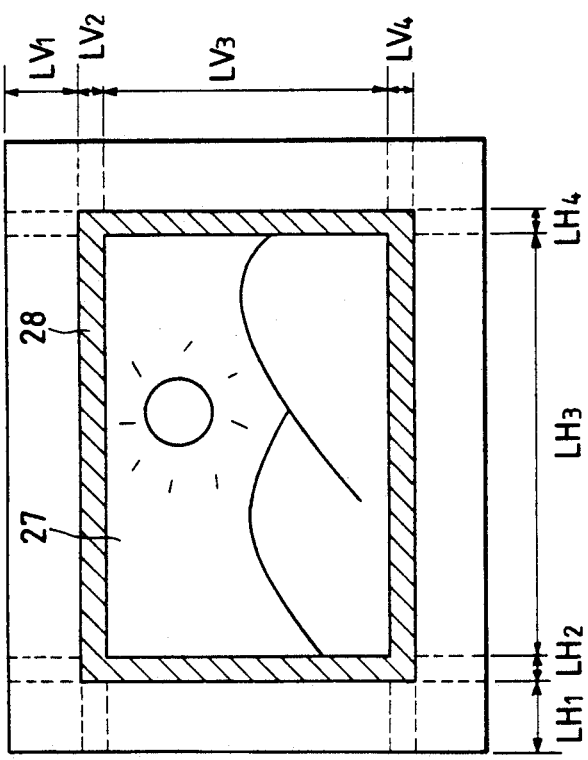
FIG. 1 shows an image and a frame portion surrounding the image on a luminous screen.

FIG. 1 is a schematic view showing the arrangement of a frame portion 28 and an image area in which an image 27 is visualized. The image 27 to be formed on a photosensitive medium is visualized on the luminous screen and the frame portion 28 is provided on the screen by a control circuit as described below such that the frame portion surrounds the image 27. In this embodiment, the frame portion 28 has a rectangular shape comprising outer and inner frames, but the shape of the frame portion is not limited thereto. Further, the color of the frame portion 28 is arbitrarily selected to obtain a picture having high contrast between the image in the image area and the background in the frame portion. The dimensional relation between the image area, the frame portion and the screen is represented by characters LV1 to LV4 and LH1 to LH4 as shown in FIG. 1.

Figure 2:
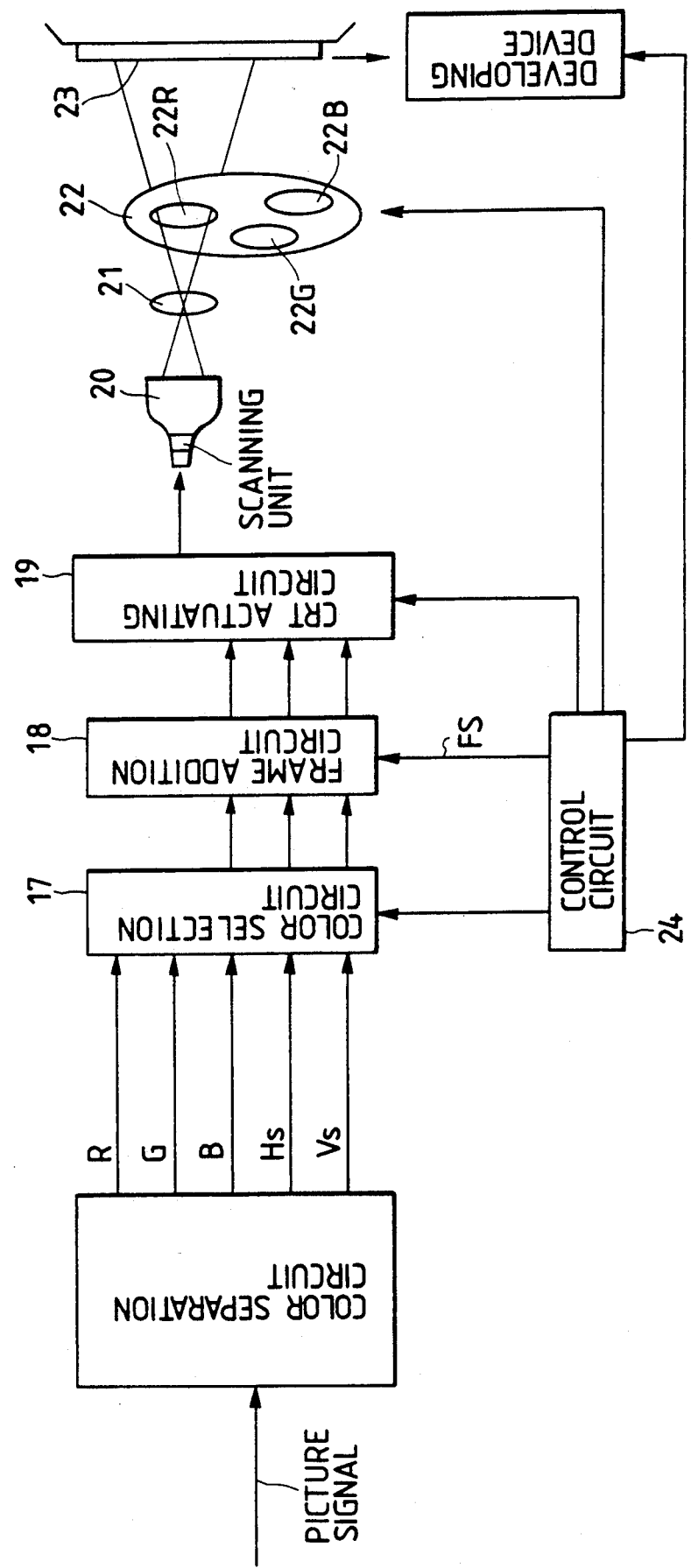
FIG. 2 is a block diagram showing an embodiment of the image exposure device of this invention.

FIG. 2 is a block diagram showing an embodiment of the image exposure device according to this invention. An input picture signal is separated into primary color component signals such as Red, Green and Blue signals in a color separation circuit and then are applied to a color selection circuit 17, together with a horizontal synchronization signal (Hs) and a vertical synchronization signal (Vs). The color selection circuit 17 is controlled by a control circuit 24 to select one of the color component signals R, G and B and to output the selected color component signal and the horizontal and vertical synchronization signals therefrom. The color component signal and horizontal and vertical synchronization signals which are outputted from the color selection circuit 17 are applied to a frame addition circuit 18. In addition to those signals, a frame color selection signal FS for indicating the color of the frame portion is supplied to the frame addition circuit 18 by the control circuit 24. In response to the frame color selection signal FS, the frame addition circuit 18 determines the color of the frame portion to be added to the image.

Figure 3:
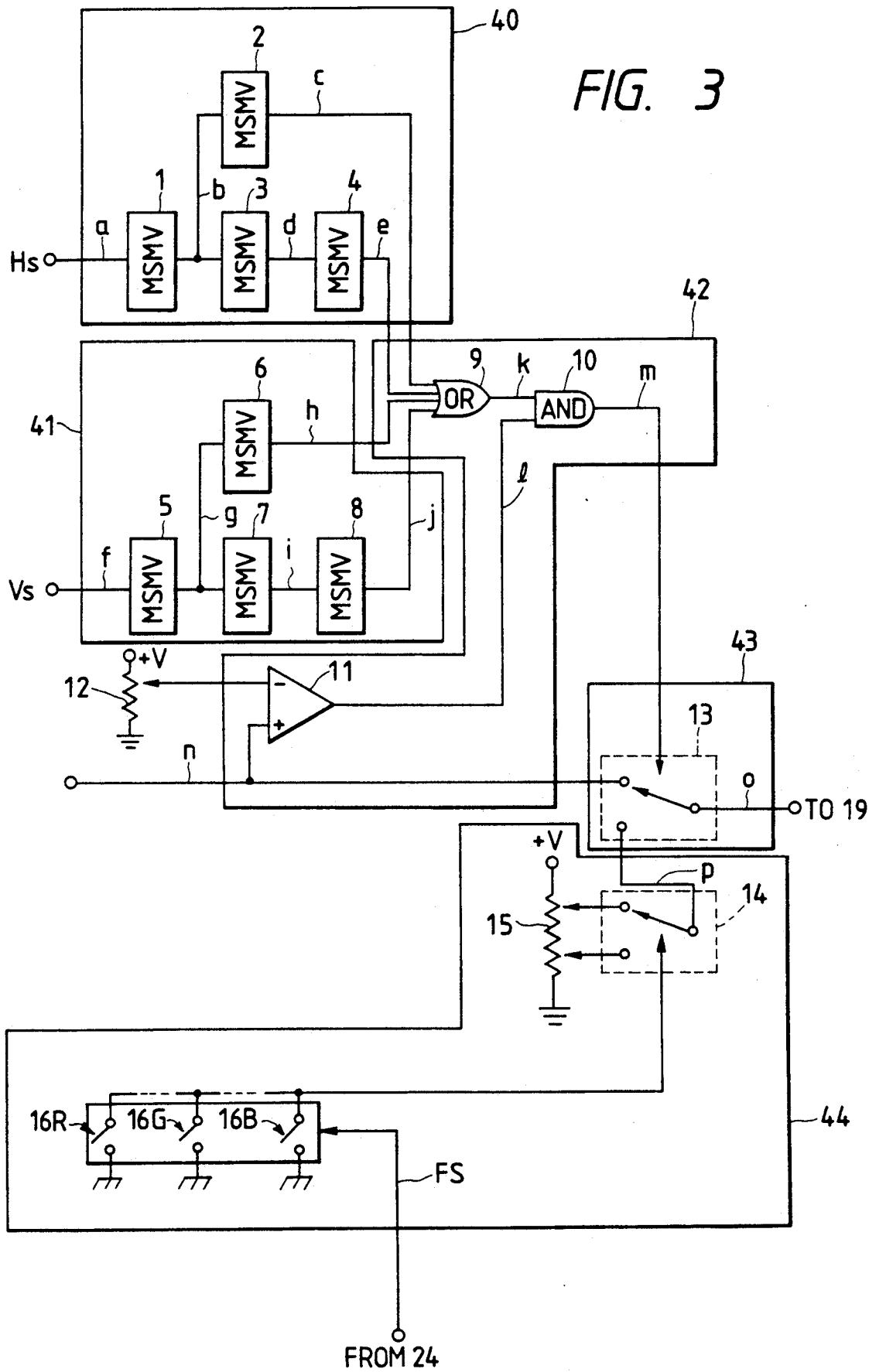
FIG. 3 shows a circuit arrangement of a frame color addition circuit in the image exposure device as shown in FIG. 2.

FIG. 3 shows the circuit arrangement of the frame addition circuit 18 as shown in FIG. 2. The frame addition circuit 18 includes a longitudinal frame addition unit 40, a lateral frame addition unit 41, a frame addition unit 42, a picture/frame selection unit 43 and a frame color selection unit 44.

The longitudinal frame addition unit 40 comprises four monostable multivibrators (1–4) for outputting a pulse signal for indicating the presence of a longitudinal frame as shown in FIG. 1. Similarly, the lateral frame addition unit 41 comprises four monostable multivibrators (5–8) for outputting a pulse signal for indicating the presence of a lateral frame as shown in FIG. 1.

Figure 4:
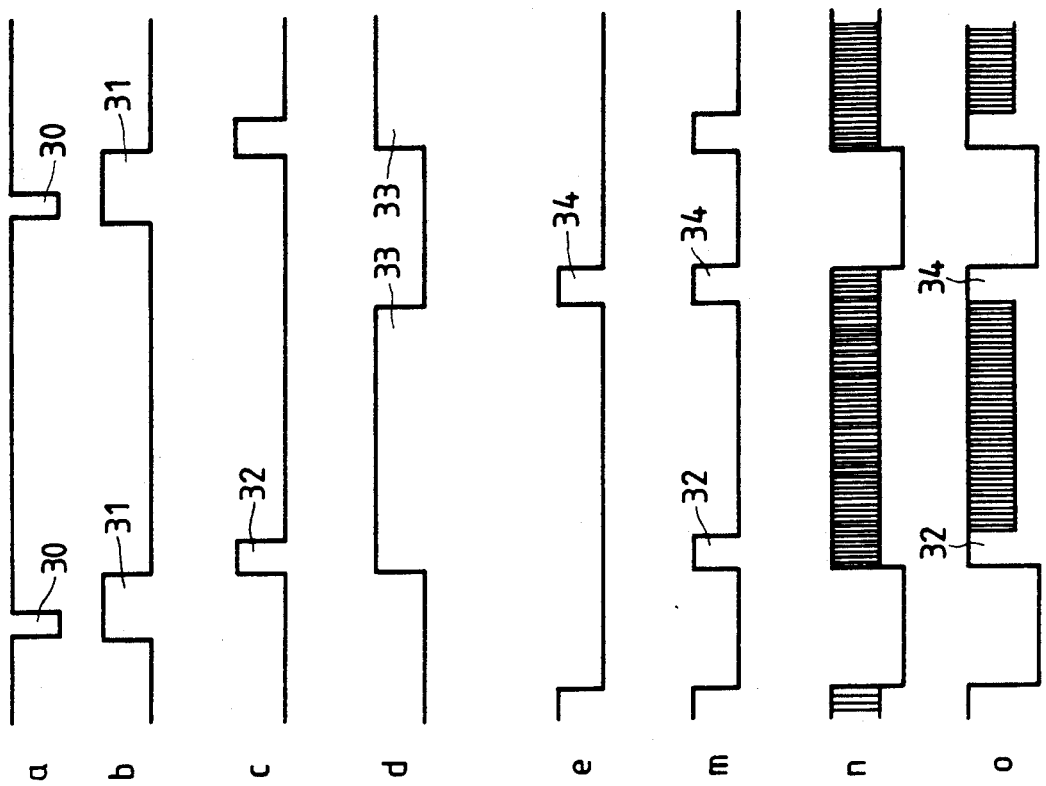
FIG. 4 shows a time chart for output signals from the frame color addition circuit as shown in FIG. 3.

The operation of the longitudinal and lateral frame addition units 40 and 41 will be described with reference to FIG. 4. A first monostable multivibrator 1 generates a pulse 31 in response to the falling of the horizontal synchronization signal 30 (Hs) of the picture image, and is designed such that the pulse 31 has a pulse width corresponding to the period of $(LH1/V_H + S_H)$ as shown in FIG. 4(b). Here, LH1 represents a distance between the left edge of the screen and the left and outer edge of the frame portion 28; $V_H$, a scanning speed in the horizontal direction of the screen; and $S_H$, a flyback time during which no image is displayed in the main (horizontal) scanning direction of the screen. The pulse 31 from the first monostable multivibrator 1 is applied to both of second and third monostable multivibrators 2 and 3. The second and third monostable multivibrators 2 and 3 are designed such that in response to the falling of the pulse 31, a pulse 32 having a pulse width of $LH2/V_H$ and a pulse 33 having a pulse width of $(LH2$ and $LH3)/V_H$ as shown in FIG. 4(c) and (d) are generated therein. The pulse 33 outputted from the third monostable multivibrator is applied to a fourth monostable multivibrator 4. The fourth monostable multivibrator is designed such that a pulse 34 having a pulse width of $LH4/V_H$ as shown in FIG. 4(e) is generated in response to the falling of the pulse 33. Accordingly, the longitudinal frame addition unit 40 outputs two types of signals (c and e) which indicate the presence of the left and right longitudinal frames on the screen, respectively. Similarly, a fifth monostable multivibrator 5 is supplied with a vertical synchronization signal Vs from the color selection circuit 17 and generates a pulse having a pulse width corresponding to the time of $(LV1/Vv+Sv)$ in response to the falling of the vertical synchronization signal Vs, where Vv represents a scanning speed in the vertical direction and Sv represents a flyback period during which no image is displayed in the vertical direction of the screen. The pulse outputted from the monostable multivibrator 5 is applied to both of sixth and seventh monostable multivibrators 6 and 7. The sixth and seventh monostable multivibrators 6 and 7 are designed such that a pulse having a pulse width of $LV2/Vv$ and a pulse having a pulse width of $(LV2+LV3)/Vv$ are generated in response to the falling of the pulse outputted from the monostable multivibrator 5. The pulse generated in the seventh monostable multivibrator 7 is supplied to an eighth monostable multivibrator 8 in which a pulse having a pulse width of $LV4/Vv$ is generated in response to the falling of the pulse outputted from the monostable multivibrator 7. Accordingly, the horizontal frame addition unit 41 outputs two types of signals (h and j) each of which indicates the presence of a lateral frame on the screen.

The output signals from the longitudinal and lateral frame addition units 40 and 41 are supplied to the frame addition unit 42 comprising an OR gate 9, an AND gate 10 and a comparator 11. The output signals from the both frame addition units 40 and 41 are applied to the OR gate 9 to be subjected to logical addition. One terminal of the AND gate 10 is supplied with the output from the OR gate 9 and the other terminal thereof is supplied with the output from the comparator 11 so that both outputs from the OR gate 9 and the comparator 11 are subjected to logical multiplication. The comparator 11 is supplied with the voltage of the picture signal (color component signal) (n) at the positive terminal thereof and with a threshold voltage at the negative terminal thereof. The threshold volatage is variable by adjusting a variable resistance 12. When the voltage of the picture signal is higher than the threshold voltage, a signal (1) having a prescribed voltage is outputted from the comparator 11, and is inputted to one terminal of the AND gate 10. The output from the AND gate 10 is applied as a control signal to a switch 13 in the picture/-frame selection unit 43.

The switch 13 is supplied with the picture signal (n) and a frame color signal (q) as input signals to selectively output one of the picture signal and the frame color signal. In this embodiment, the switch 13 outputs the frame color signal (q) when the voltage of the control signal (m) from the AND gate 1 is high (above a prescribed threshold voltage) and outputs the picture signal (n) when the voltage of the control signal (m) is low (below the prescribed threshold voltage). The frame color signal (q) has at least two voltage levels which are switched by a switch 14 as shown in FIG. 3. Accordingly, the color indicated by the frame color signal (q) is determined in accordance with the switching operation of the switches 16R, 16G and 16B which correspond to the colors R, G and B, respectively, and the density of the indicated color is determined in accordance with the switching operation of the switch 14. The switching operation of the switches 16R, 16G and 16B is controlled by the frame color selection signal (FS).

The output from the switch 13 is applied to a CRT (cathode ray tube) actuating circuit 19 as shown in FIG. 2, together with the horizontal and vertical synchronization signals included in the picture signal. The CRT actuating circuit 19 is connected to a CRT (cathode ray tube) 20 having a scanning unit for scanning the green thereof in a predetermined direction and controls the operation of the CRT 20 in accordance with the output signal from the switch 13.

The outside of the frame portion 28 is arranged on the screen in such a manner that the scanning operation in the outside of the frame portion 28 is synchronous with a blanking pulse or such that the outside sufficiently covers the frame portion 28. Such an arrangement of the outside of the frame portion prevents the short and long sides of the frame portion from being crossed and from being overstepped over the screen.

The CRT 20 is so arranged as to confront a photosensitive medium 23 through an optical system 21 such as a lens system 21 and a filter unit 22. The optical system 21 is adjusted so that the image on the screen of the CRT 20 is formed on the photosensitive medium 23. The filter unit 22 includes thereon three color filters 22R for red, 22G for green and 22B for blue, and is controlled by the control circuit 24 to selectively dispose one of three color filters in the optical path between the CRT 20 and the photosensitive medium 23. The image formed on the photosensitive medium 23 is developed by a developing device 26.

The operation of the image exposure device according to this invention will be described in detail.

At a first stage, a frame color is set by the switching operation of the switches 16R, 16G and 16B. It is assumed that an image of red color is formed on the photosensitive medium. The control unit 24 controls the filter unit 22 to dispose the red filter 22R in the optical path, and then controls the color selection circuit 17 to extract only the red component signal from the picture signal which has been outputted from the color separation circuit and to output the extracted red component signal to the frame color addition circuit 18.

In the frame color addition circuit 18, the position of the frame portion is determined with cooperation of the monostable multivibrators 1 to 8 and the OR gate 9.

The above operation in the frame color addition circuit 18 will be described in detail with reference to FIG. 4.

The signals designated by the reference numerals (a) to (o) correspond to the signals on the signal lines as indicated by the same reference numerals in FIG. 3, respectively. A horizontal section of the longitudinal sides of the frame portion 28 is determined by the first to forth monostable multivibrators (1 to 4), that is, the pulse 32 outputted from the second monostable multivibrator 2 corresponds to the left longitudinal side of the frame portion 28 while the pulse 34 outputted from the forth monostable multivibrator 4 corresponds to the right longitudinal side of the frame portion 28. The pulses 32 and 34 indicating the longitudinal sides of the frame portion are logically added in the OR gate and then applied through the AND gate 10 to the switch 13 as a control signal. The control signal has a high level when the scanning position on the screen of the CRT 20 is within the frame portion 28, and a low level when the scanning position is outside of the frame portion 28 (except for the flyback period). As described above, the switch 13 outputs the picture signal supplied by the color selection circuit 17 when the control signal is low, and outputs the frame color signal obtained by the picture/frame selection unit 43 when the control signal is high. The output signal from the switch 13 for the horizontal scanning operation has the time chart as shown in FIG. 4(o) in which the picture signal is sandwiched between the pulses 32 and 34. The output signal is applied through the CRT driving circuit 19 to the CRT 20, in which a white-and-black image corresponding to the component signal of the input picture signal is displayed on the screen in accordance with the output signal as shown in FIG. 4(o), and further the frame portion having a color determined by the switches 16R, 16G and 16B and a density of the color determined by a switch 14 is displayed on the screen in such a manner that the frame portion surrounds the image. The image provided with the frame portion on the screen of the CRT 20 is optically formed through the optical system 21 and the filter 22R on the photosensitive medium 23, so that a red image is formed on the photosensitive medium 23. Similarly, the green filter 22G and the blue filter 22B are successively selected and disposed in the optical path and the color component signal corresponding to the selected filter is extracted from the picture signal by the color selection circuit 17. The image of the color component signal on the screen of the CRT 20 is optically formed on the photosensitive medium 23 on which the image of the red component has been formed.

The photosensitive medium 23 on which the red, green and blue images have been superposedly formed is developed in the developing device 26. Accordingly, the image exposure device according to this invention finally provides a photosensitive medium with a picture includes an image surrounded by a frame portion whose the color and density can be freely determined.

In the embodiment as described above, the color and the density of the frame portion is limited to white, black, red, green, blue, magenta, cyan and yellow and two levels, respectively. However, this invention is not limited thereto. For example, any color and density may be provided to the frame portion by enabling the resistance 15 to be freely adjusted or by employing another variable voltage source (for example, D/A converter). Further, in this embodiment a frame portion is a tablet type comprising an inner frame and an outer frame and the shape of the frame portion is rectangular. However, the structure and shape of the frame portion is not limited thereto.

As described above, according to the image exposure device of this invention, the frame portion whose color and density are arbitrarily determined can be provided with the image, so that the image emphasis effect is more accurately obtained for a picture finally obtained than that of the conventional device, and classification and arrangement of the obtained pictures can be easily made when the pictures are filed.

What is claimed is:

1. An image exposure device for optically forming an image on photosensitive medium, comprising:
   luminous display means having a screen for displaying an image data and a frame portion on the screen and projecting the image of the image data and the frame portion on the photosensitive medium, said frame portion defining an area on which the image is formed;
   color indicating means for indicating the color of the frame portion and outputting a color signal indicating the color; and
   display control means for controlling said display means to display the frame portion on the screen in the color indicated by said color indicating means in response to the color signal.

2. An image exposure device as claimed in claim 1, wherein the image data includes color component signals and a synchronization signal, and wherein said display control means comprises color selection means for selecting one of the color component signals and outputting the selected color component, frame portion addition means for receiving the color component from said color selection means, generating a frame signal indicative of the frame portion and selectively outputting one of the color component signal and the color signal indicated by said color indicating means in response to the frame signal, and display actuating means for actuating said display means in accordance with an output signal from said frame portion addition means.

3. An image exposure device as claimed in claim 2, wherein said display means includes scanning means for successively scanning the screen of said display means in a predetermined direction and wherein said frame portion addition means comprises a frame indicating means for generating a pulse signal when the scanning position of said scanning means on the screen is within the frame portion, and signal selecting means for receiving the color component signal and the color signal, and outputting the color signal when the pulse signal exists and the color component signal when no pulse signal exists, so that said display means displays the color of the color signal on the screen when the scanning position is within the frame portion.

4. An image exposure device as claimed in claim 3, wherein said color indicating means includes color density selecting means for freely setting the density of the indicated color of the fame portion.

5. An image exposure device as claimed in claim 4, wherein said color density selecting means comprises a variable resistance.

6. An image exposure device as claimed in claim 4, wherein said color density selecting means comprises a variable voltage source.

* * * * *